United States Patent [19]

Sachs

[11] Patent Number: 4,558,599
[45] Date of Patent: Dec. 17, 1985

[54] BOLT DEMONSTRATOR

[75] Inventor: Neville W. Sachs, Liverpool, N.Y.

[73] Assignee: Allied Corporation, Morris Township, Morris County, N.J.

[21] Appl. No.: 489,293

[22] Filed: Apr. 28, 1983

[51] Int. Cl.⁴ .............................................. F16B 31/02
[52] U.S. Cl. ..................................... 73/761; 73/862.58
[58] Field of Search ..................... 73/837, 862.58, 1 C, 73/761

[56] References Cited

U.S. PATENT DOCUMENTS

| | | | |
|---|---|---|---|
| 1,755,849 | 4/1930 | Temple | 73/862.58 |
| 2,978,898 | 4/1961 | Skidmore | 73/1 C |
| 3,495,907 | 2/1970 | Rogers | 73/761 |

FOREIGN PATENT DOCUMENTS 126838 10/1980 Japan ..................................... 73/761

Primary Examiner—Bernard Nozick
Attorney, Agent, or Firm—Arthur J. Plantamura; Jay P. Friedenson

[57] ABSTRACT

A device for measuring the clamping force of a nut and bolt assembly is disclosed. The device includes a pair of adjacent, parallel metal plates each having a passage therethrough, which are in axial alignment with each other. Positioned between the plates is some pressure sensing means for sensing pressure, such as hydraulic cylinder, which is in pressure transmitting communication with some pressure measuring device, as for example a pressure gauge.

6 Claims, 1 Drawing Figure

BOLT DEMONSTRATOR

BACKGROUND OF THE INVENTION

1. Field of the Invention

This invention relates to a device for measuring the compressive load developed by a bolt or clamping device during the tightening procedure. More particularly, this invention relates to a device for measuring the maximum clamping force of a bolt or like clamping device so that during use such bolt can be tightened to the maximum to render it more resistant to fatigue failure. The device of this invention is also useful in demonstrating to field personnel proper bolt tightening techniques, and the effects of oils and like substances on the bolt's clamping force and the torque required to tighten the bolt to the maximum.

2. Prior Art

Bolts, as for example, stove bolts (with and without cotter pins), carriage bolts, machine bolts, eye-bolts, plow bolts and the like are metal pins or rods for fastening objects together. A bolt usually has a head at one end and is helically or spirally threaded along all or a portion of its length. The bolt is usually secured by means of a threaded nut which is attached to the bolt at the end opposite the head by rotation about the longitudinal axis of the bolt.

Heretofore, several disadvantages have been associated with the use of bolts as fastening devices, especially with regard to the incidence of bolt failure due to metal fatigue. For example, it is often very difficult to adequately determine under actual use conditions when a nut and bolt assembly has been tightened to the maximum. This is crucial information in that it provides an indication as to the actual clamping force exerted by the nut and bolt assembly and indicates when the assembly is most resistant to fatigue failure. This information also indicates when further tightening should be discontinued so as to prevent structural deformation and weakening of the bolt. A further disadvantage associated with the conventional use of nut and bolt assemblies is the strength of materials used in the construction of such assemblies.

Thus, it is an object of this invention to provide a means for determining or measuring the maximum clamping force of a bolt and nut assembly under actual use conditions, and the strength of materials used in bolt and nut construction. It is also an object of this invention to provide a teaching device for demonstrating to field personnel proper bolt tightening techniques, and the effects of oils and like substances on the bolt's clamping force and the torque required to tighten the bolt to the maximum. Other objects and advantages of this invention will be apparent from the following specification and claims.

SUMMARY OF THE INVENTION

In accordance with this invention, there is provided a device for measuring the maximum clamping force exerted by a nut and bolt assembly. The device of this invention comprises:

(a) a pair of adjacent retaining means in parallel alignment, each of said means having at least one passage therethrough, at least one of said passages in one of said retaining means being in axial alignment with at least one passage in the other retaining means;

(b) sensing means positioned between said retaining means for sensing pressure generated by compression of said retaining means; and (c) pressuring measuring means for measuring said pressure sensed by said sensing means.

BRIEF DESCRIPTION OF THE DRAWINGS

The present invention is more fully explained hereinafter in connection with the accompanying FIG. 1 which is a sectional view of one preferred embodiment of this invention.

DESCRIPTION OF THE PREFERRED EMBODIMENTS OF THE INVENTION

Figure 1:
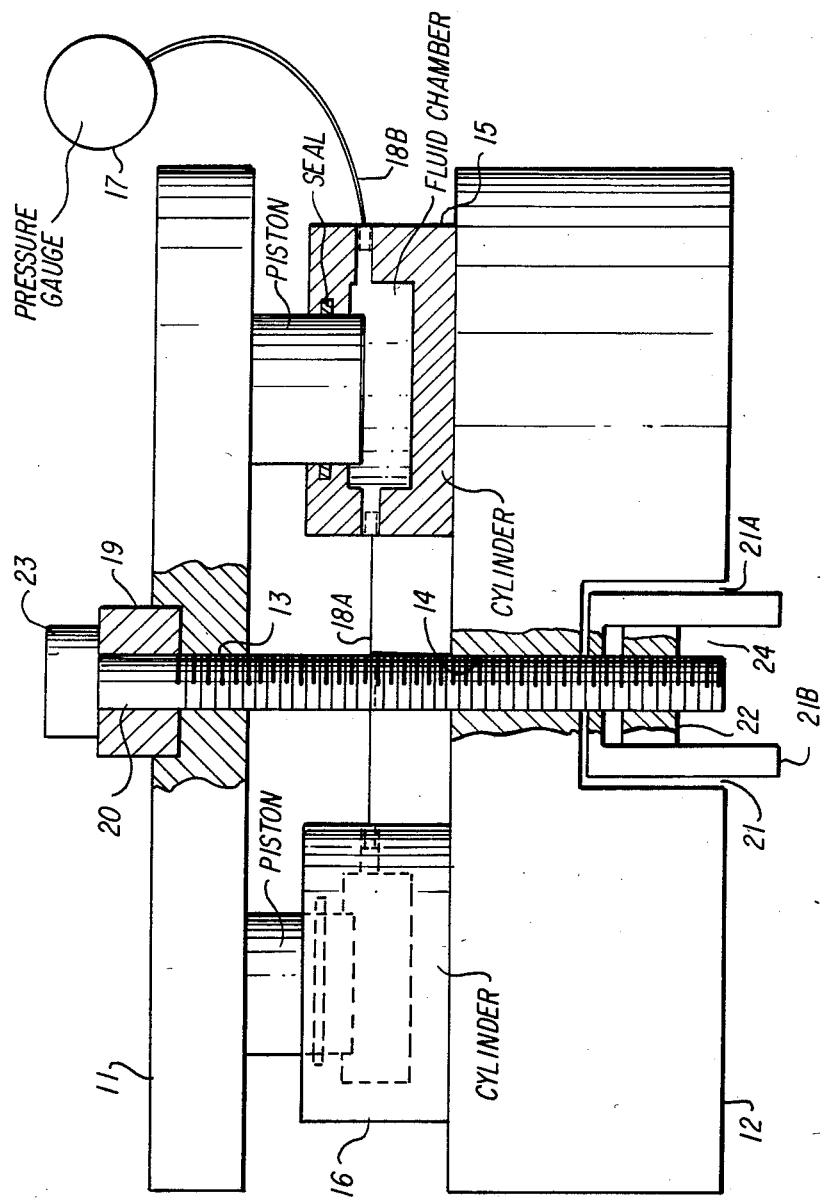

The present invention and its unique advantages are more readily apparent from attached FIG. 1. As shown in FIG. 1, one preferred embodiment of the invention consists of a pair of retaining means 11 and 12 which in drawing are adjacent horizontal plates preferably constructed of metal as for example steel, which are in substantially parallel alignment. Upper and base plates 11 and 12 include passages 13 and 14, respectively therethrough. In the preferred embodiments of the invention these passages 13 and 14 are in substantially axial vertical alignment. Positioned between means 11 and 12 are pressure sensing means 15 and 16 for sensing the pressure applied to upper and lower plates 11 and 12. In the preferred embodiment of the invention depicted in FIG. 1, pressure sensing means 15 and 16 are two hydraulic cylinders C and pistons P. However, it should be appreciated that any conventional pressure sensing means capable of sensing the compressive force applied to plates 11 and 12 can be used in the practice of this invention. The embodiment of FIG. 1 comprises a pressure measuring means, which is pressure gauge 17, in hydraulic communications with pressure sensing means 15 and 16 by way of action of the piston P in the cylinder C and line 18A connecting the cylinders and line 18B.

The preferred embodiment of the invention depicted in FIG. 1 also includes an anti-friction means, such as, the antifriction bearing 19, adjacent to the upper surface of plate 11 in axial alignment with passage 13 for supporting the head of a bolt being listed to allow for easy rotation of each head during the tightening procedure, and to isolate the frictional effects of a lubricant on the threads of bolt 23. It should be appreciated that antifriction means is not an essential feature of the device of this invention, and can be replaced with alternative materials or elements to simulate other actual or potential use conditions as for example a cast iron part, a non-metallic part, and the like. In the embodiment of FIG. 1, the specific anti-friction means employed in bearing 19. Bearing 19 has a passage therethrough, which passage is in vertical axial alignment with passages 13 and 14 of upper retaining means 11 and base retaining means 12 respectively. As shown in FIG. 1, base plate 12 includes a nut locking means 21 for locking or securing nut 22 during the tightening procedure. Locking means 21 includes a polygonal recess 21A which is concentrically positioned about the opening of passage 14, and a locking element 21B which is inserted into recess 21A the structural configuration of which is complementary to that of nut 22.

The operation of the device of this invention can be more readily appreciated from FIG. 2. As is apparent from FIG. 1, the rod portion of bolt 23 is inserted into opening of passage 20 through bearing 18, into the opening of passage 13 through retaining plate 11 into the opening of passage 14 and through retaining plate 12. Nut 22 is placed into nut locking means 21 which in the embodiment of FIG. 1 consists of an indentation 24 whose structural configuraton is complementary to that of nut 22 and is designed to receive and retain nut 22 during the tightening process.

As the head of bolt 23 is tightened using some sort of bolt tightening means, as for example a wrench (not shown), pressure is applied to pressure sensing means 15 and 16. This pressure is transmitted to gauge 17 by way of line 18 where it is measured. The tightening process is continued until there is no further increase in pressure. The pressure measured at that point is the maximum clamping force of the nut and bolt assembly. The value of measuring the maximum clamping forces is results from the fact that a nut and bolt combination are most resistant to fatigue failure when it is tightened to the maximum.

As is readily apparent from the foregoing, this invention is a valuable tool to test the clamping force generated by various nut, bolt, and lubricant combinations, and the torque needed to provide for maximum clamping force under use conditions. It's design and construction lend itself to field use in demonstrating actual conditions to operating personnel.

What is claimed is:

1. A device for measuring the clamping force of a bolted nut assembly which comprises:
   (a) a pair of adjacent retaining means in parallel alignment, each of said means having at least one passage therethrough, and at least one of said passages in one of said retaining means being in substantial axial alignment with at least one of said passages in the other retaining means;
   (b) means for driving said retaining means in compressive relationship; a bolt passing through the passage in each of the retaining means and secured to a nut;
   (c) pressure sensing means positioned between said retaining means for sensing pressure generated by compression of said retaining means;
   (d) means for maintaining said retaining means, compression driving means and sensing means in operable relation;
   (e) anti-friction means in which said bolt is mounted to allow substantially non-friction rotation of the bolt during bolt tightening of said retaining means;
   (f) locking means mounted contiguous to said nut for locking said nut of said nut and bolt assembly during compression of said retaining means; and
   (g) pressure measuring means for measuring said pressure sensed by said pressure sensing means.

2. A device according to claim 1 wherein said anti-friction means is an anti-friction bearing, having a passage therethrough, said passage positioned in axial alignment with one of said passages of said upper retaining means.

3. A device according to claim 1 wherein said pair of retaining means are an upper plate and a lower plate having one or more passages therethrough.

4. A device according to claim 3 wherein said locking means comprises a polygonal recess positioned about an opening of at least one of said passages through said lower plate, and an insertable locking element for insertion in said recess, whose structural configuration is complementary to outer surfaces of said nut.

5. A device according to claim 1 wherein said pressure sensing means comprises a hydraulic cylinder and piston.

6. A device according to claim 5 wherein said pressure measuring means is a pressure gauge in hydraulic pressure transmitting communication with said hydraulic cylinder and piston sensing means.

* * * * *